March 25, 1930.
L. S. HARBER ET AL
MACHINE FOR THE MIXING, AERATING, AND
LIKE TREATMENT OF VARIOUS MATERIALS
Filed July 23, 1928
1,751,548
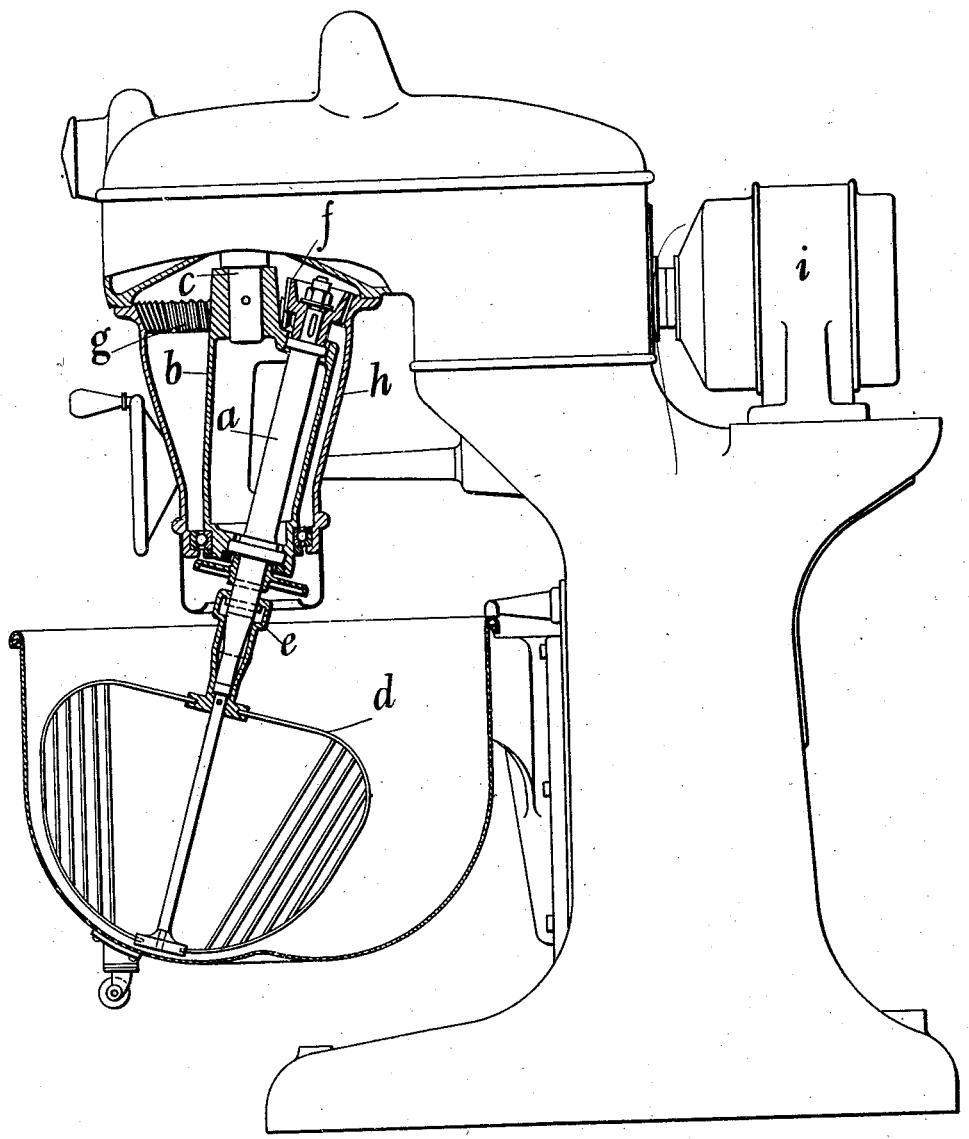
INVENTORS
LAURENCE SEYMOUR HARBER
AND JOHN EDWARD POINTON
BY George B. Willcox
ATTORNEY Patented Mar. 25, 1930

1,751,548

UNITED STATES PATENT OFFICE

LAURENCE SEYMOUR HARBER AND JOHN EDWARD POINTON, OF PETERBOROUGH, ENGLAND, ASSIGNORS TO BAKER PERKINS COMPANY INCORPORATED, OF NEW YORK, N. Y.

MACHINE FOR THE MIXING, AERATING, AND LIKE TREATMENT OF VARIOUS MATERIALS

Application filed July 23, 1928, Serial No. 294,780, and in Great Britain August 9, 1927.

This invention relates to machines for the mixing, aerating and similar treatment of various materials, particularly such as are used for the making of cakes and confectionery, the machines being of the type comprising a beater, whisk or its equivalent adapted to be rotated and otherwise moved in a pan or receptacle containing the materials.

The invention has for its object to obtain with simplicity and convenience a more effective treatment of the materials to adapt them for the required purposes.

The invention comprises the combination with the means for effecting the rotation of the beater, whisk or the like, and its planetary or circular progressive movement in the interior of the pan or trough, of means whereby the said progressive movement is caused to follow an inclined circular path such as will provide for a continuous picking up or raising of the materials by the beater from the bottom of the pan, ensuring a thorough and uniform mixing, aeration or like treatment of the mass.

The accompanying explanatory drawing represents, in side elevation and partly in section, a machine having this invention applied thereto.

As is shown in the drawing, the beater spindle $a$ is angularly mounted upon a housing $b$ secured upon a central pin or stem $c$ which is rotated (carrying the said beater spindle $a$ and housing $b$ therewith) through gearing arranged in any convenient manner. The beater, whisk or the like, as $d$, is detachably fitted, by a bayonet joint $e$ or other connection, to the lower end of the said spindle $a$, whilst to its upper end there is secured a gear wheel or pinion $f$ engaging a fixed toothed annulus $g$, the arrangement being such that the spindle $a$ is rapidly rotated on its own axis simultaneously with its planetary or circular progressive movement imparted by the continuously rotating housing $b$.

Due to the constant angular disposition of the beater spindle $a$ relatively to the axis of the continuously rotating housing $b$ the path or orbit of the said planetary or progressive circular movement of the spindle is correspondingly inclined, with the result that the beater $d$ attached to the spindle is given the aforesaid picking up action on the materials within the pan or trough.

Suitable ball or other bearings are provided for the spindle $a$ in its rotatable housing $b$ and the latter is also mounted in ball bearings arranged with its fixed casing or like part $h$.

Speed changing gear or transmitting mechanism may be provided between the electric motor $i$ or other driving means of the machine and the beater spindle and associated parts.

Having thus described our invention what we claim as new and desire to secure by Letters Patent is:—

The combination with a frame, a fixed casing thereon including a fixed toothed annulus at its upper end and a journal bearing at its lower end, a rotatable pin coaxial with the annulus and carried by the frame, a housing fixed to said pin and rotatable therewith, the lower end of said rotatable housing journaled in the lower bearing of the fixed casing for rotation therein, the upper and lower parts of the rotatable housing formed with spindle-receiving bearings, an angularly disposed spindle journaled in said bearings, the upper end of said spindle above said upper bearing carrying a pinion meshing with said toothed annulus.

In testimony whereof we have signed our names to this specification.

LAURENCE SEYMOUR HARBER.
JOHN EDWARD POINTON.